United States Patent
Costin et al.

[11] 3,957,243
[45] May 18, 1976

[54] LATCH MECHANISM FOR HORIZONTALLY OSCILLATING SEAT

[75] Inventors: Robert W. Costin, Troy, Mich.; Randal T. Murphy, Morristown, Tenn.

[73] Assignee: Lear Siegler, Inc., Detroit, Mich.

[22] Filed: Mar. 3, 1975

[21] Appl. No.: 554,862

[52] U.S. Cl. .................................... 248/370; 248/430
[51] Int. Cl.² .................. A45D 19/04; F16M 13/00
[58] Field of Search ................. 248/370, 393–396, 248/400, 419, 420, 421, 424, 429, 430; 292/128, DIG. 49; 297/344

[56] References Cited
UNITED STATES PATENTS

| | | | |
|---|---|---|---|
| 876,982 | 1/1908 | Lerro | 248/424 X |
| 2,240,143 | 4/1941 | Lustig | 248/430 X |
| 2,256,004 | 9/1941 | Thomas | 248/424 X |
| 2,284,571 | 5/1942 | Heller | 248/370 |
| 3,100,617 | 8/1963 | Radke et al. | 248/430 |
| 3,258,241 | 6/1966 | Oswald | 248/430 |

FOREIGN PATENTS OR APPLICATIONS

| | | | |
|---|---|---|---|
| 647,229 | 6/1937 | Germany | 292/128 |

*Primary Examiner*—Roy D. Frazier
*Assistant Examiner*—Lawrence J. Staab
*Attorney, Agent, or Firm*—Reising, Ethington, Barnard, Perry and Brooks

[57] ABSTRACT

A latch mechanism for a vehicle seat whose seat back and seat cushion components are fixedly mounted on a seat base that is suspended on a sub-base for oscillating forward and rearward movement with respect to the vehicle so as to isolate the seat occupant from longitudinal vehicle vibrations. The latch mechanism includes a keeper fixedly mounted on the sub-base and having forwardly and rearwardly facing latch surfaces. A latch member of the latch mechanism is pivotally mounted on the seat base and is movable between latching and nonlatching positions with respect to the keeper. The latch member has forwardly and rearwardly facing latch surfaces in the latching position that respectively engage the rearwardly and forwardly facing latch surfaces of the keeper to hold the seat against the oscillating movement in a rattle-free manner when a seat occupant desires a fixed seating position such as when vehicle controls must be manipulated during parking and backing operations. An over-center spring selectively and alternately biases the latch member to either its latching or nonlatching positions and the engagement of the latch surfaces on the keeper and the latch member provides a stop that limits the latch member movement under the bias of the spring while in the latching position.

17 Claims, 9 Drawing Figures

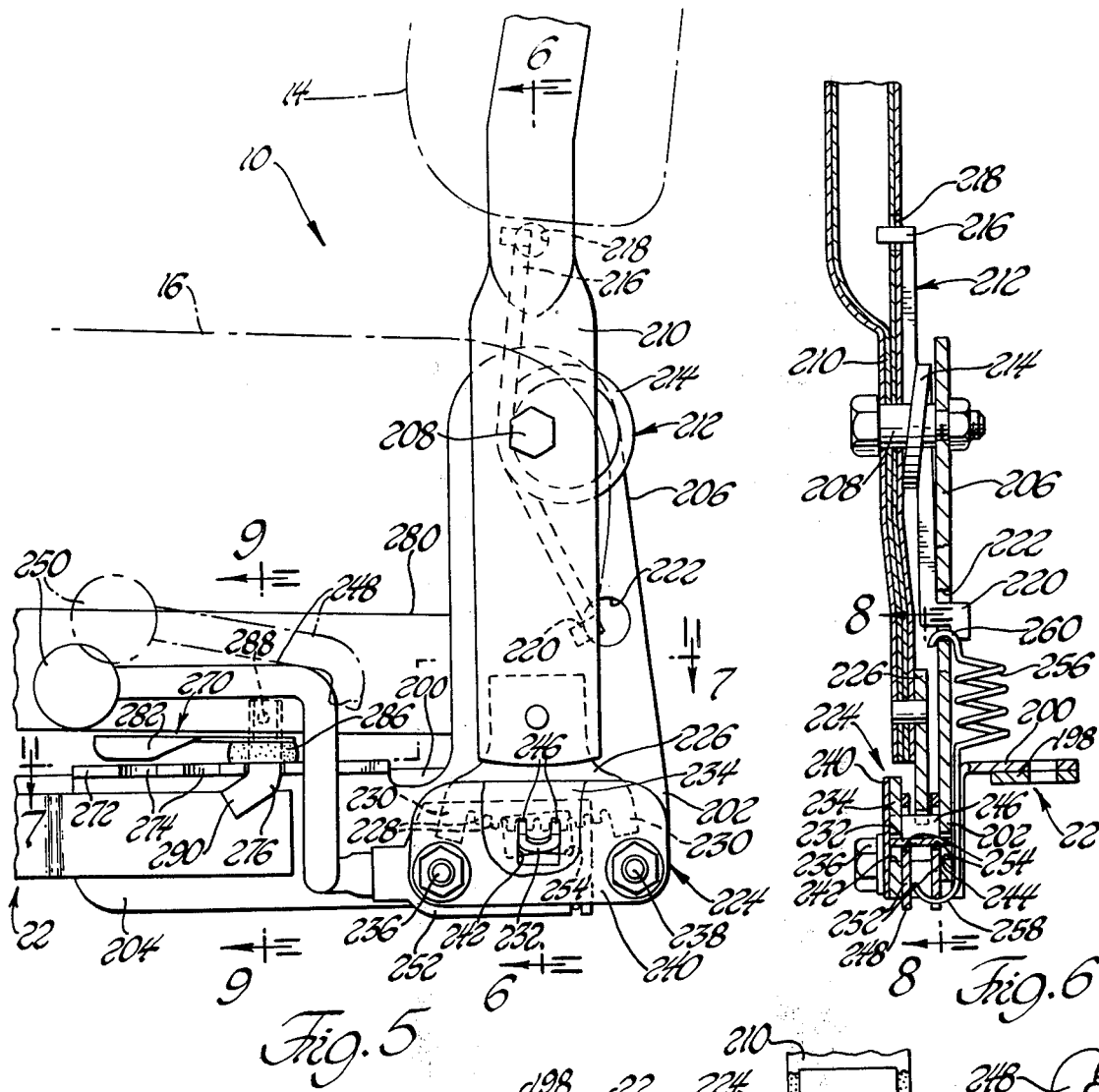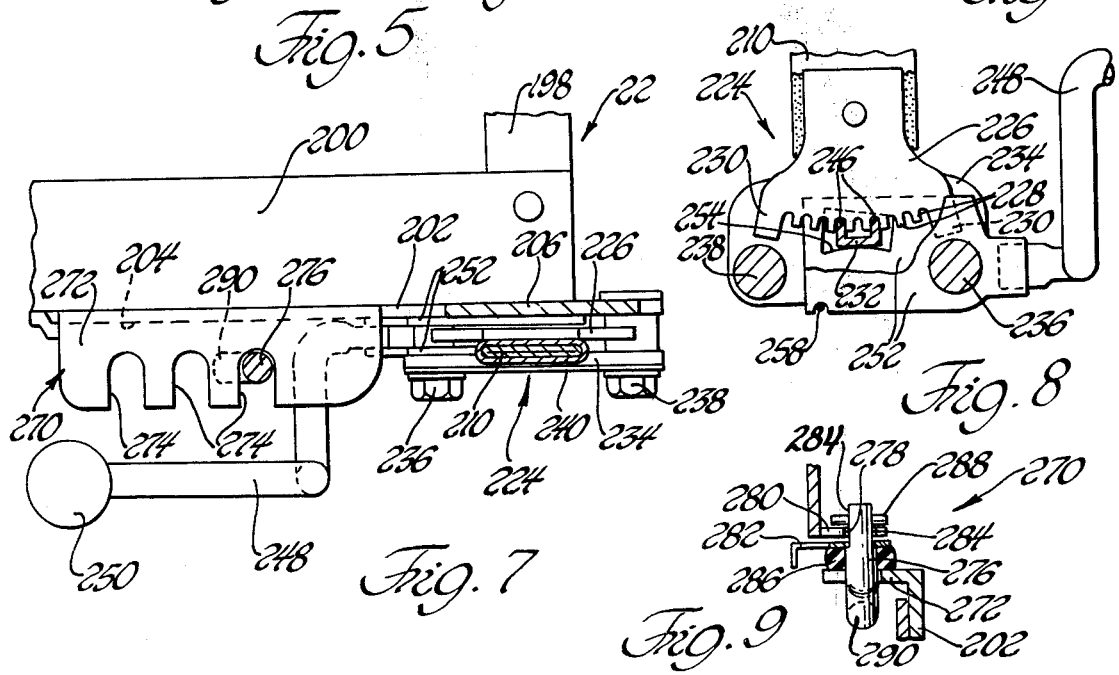

3,957,243

LATCH MECHANISM FOR HORIZONTALLY OSCILLATING SEAT

BACKGROUND OF THE INVENTION

This invention relates broadly to vehicle seats and more particularly to vehicle seats wherein the seat back and seat cushion components are suspended for movement to isolate a seat occupant from vehicle vibrations.

DESCRIPTION OF THE PRIOR ART

Prior vehicle seats have utilized fluid support systems for isolating the seat occupant from vertical vehicle vibrations. Usually this type of fluid support system is utilized with vehicle seats used on trucks to lessen the fatigue experienced by the truck driver who is at the wheel for extended periods of time. Prior vehicle seats have also suspended the seat cushion and seat back components for oscillating movement in a forward and rearward direction to isolate the seat occupant from horizontal vibrations along a longitudinal vehicle direction.

SUMMARY OF THE INVENTION

An object of the present invention is to provide a vehicle seat support assembly that mounts a vehicle seat for oscillating movement to isolate the seat occupant from longitudinal vehicle vibrations and which includes an improved latch mechanism for selectively latching the seat against its oscillating movement at times when the seat occupant desires a fixed seat such as during manipulation of the vehicle controls during parking and backing operations.

In the preferred embodiment, the support assembly also includes a fluid system that suspends the seat for vertical oscillating movement to isolate the seat occupant from vertical vehicle vibrations. An upper base of the support assembly supports the seat cushion and seat back components and includes side rails that are pivotally supported by the lower ends of vertical suspension links whose upper ends are pivotally supported on a sub-base of the upper base. The seat components oscillate forwardly and rearwardly on the sub-base to isolate the seat occupant from horizontal vehicle vibrations. The sub-base is carried by a fluid spring whose lower end is supported on a floor base. The fluid spring provides the isolation of the seat components from the vertical vehicle vibrations.

The latch mechanism includes a keeper mounted on the sub-base and selectively engaged and disengaged by a latch member that is mounted on a plate carried by the side rails of the upper base. Engagement of the latch member with the keeper prevents the horizontal oscillating seat movement so that a seat occupant has a fixed support from which to operate the vehicle controls during delicate maneuvering operations. Disengagement of the latch member from the keeper permits the seat components to oscillate in their forward and rearward mode to isolate the occupant from longitudinal vehicle vibrations during long distance travel.

The keeper on the sub-base has forwardly and rearwardly facing latch surfaces that are respectively engaged by rearwardly and forwardly facing surfaces of the latch member in the latching position of the latch member. The engagement of the latch surfaces on the keeper and latch member prevents the seat oscillation in a rattle-free manner to provide an effective latch mechanism, and this engagement is ensured by an overcenter spring that biases the latch surfaces of the keeper and latch member into engagement with each other. Upon manually actuated movement of the latch member to its nonlatching position, the latch surfaces of the latch member disengage the latch surfaces of the keeper to permit the oscillating seat movement. The overcenter spring then moves across an axis of pivotal movement of the latch member so as to bias the latch member into engagement with a stop in its nonlatching position. Rotation of the latch member is provided by a handle that is pivotally mounted on the plate that also carries the latch member, and the handle is engaged with the latch member in a pin-and-slot fashion to permit the axes of rotation of the latch member and handle to be in a spaced relationship with respect to each other.

The keeper preferably is an upstanding pin that is received within an opening in the latch member. The latch member opening has an enlarged portion in which the keeper is received while the latch member is in the nonlatching position so as to permit the oscillating movement, and also has a tapered slot which is open ended and defines the forwardly and rearwardly facing latch surfaces of the latch member. The tapered configuration of the open ended slot ensures the engagement between the forwardly and rearwardly facing surfaces of the keeper and the rearwardly and forwardly facing surfaces of the latch member, respectively. Also, the latch member has a plate-like construction that pivots in a horizontal plane between the sub-base and the seat cushion to provide a compact mechanism.

Other objects and advantages of the present invention will become readily apparent from the following detailed description of the preferred embodiment taken in connection with the accompanying drawings.

BRIEF DESCRIPTION OF THE DRAWINGS

FIG. 5 is a partially broken away enlarged view of a portion of FIG. 1;

FIG. 6 is a sectional view taken along line 6—6 of FIG. 5;

FIG. 7 is a partial sectional view looking downwardly approximately along line 7—7 of FIG. 5;

FIG. 8 is a view taken along line 8—8 of FIG. 6; and

FIG. 9 is a sectional view taken along line 9—9 of FIG. 5.

DETAILED DESCRIPTION OF THE PREFERRED EMBODIMENT

Figure 1:
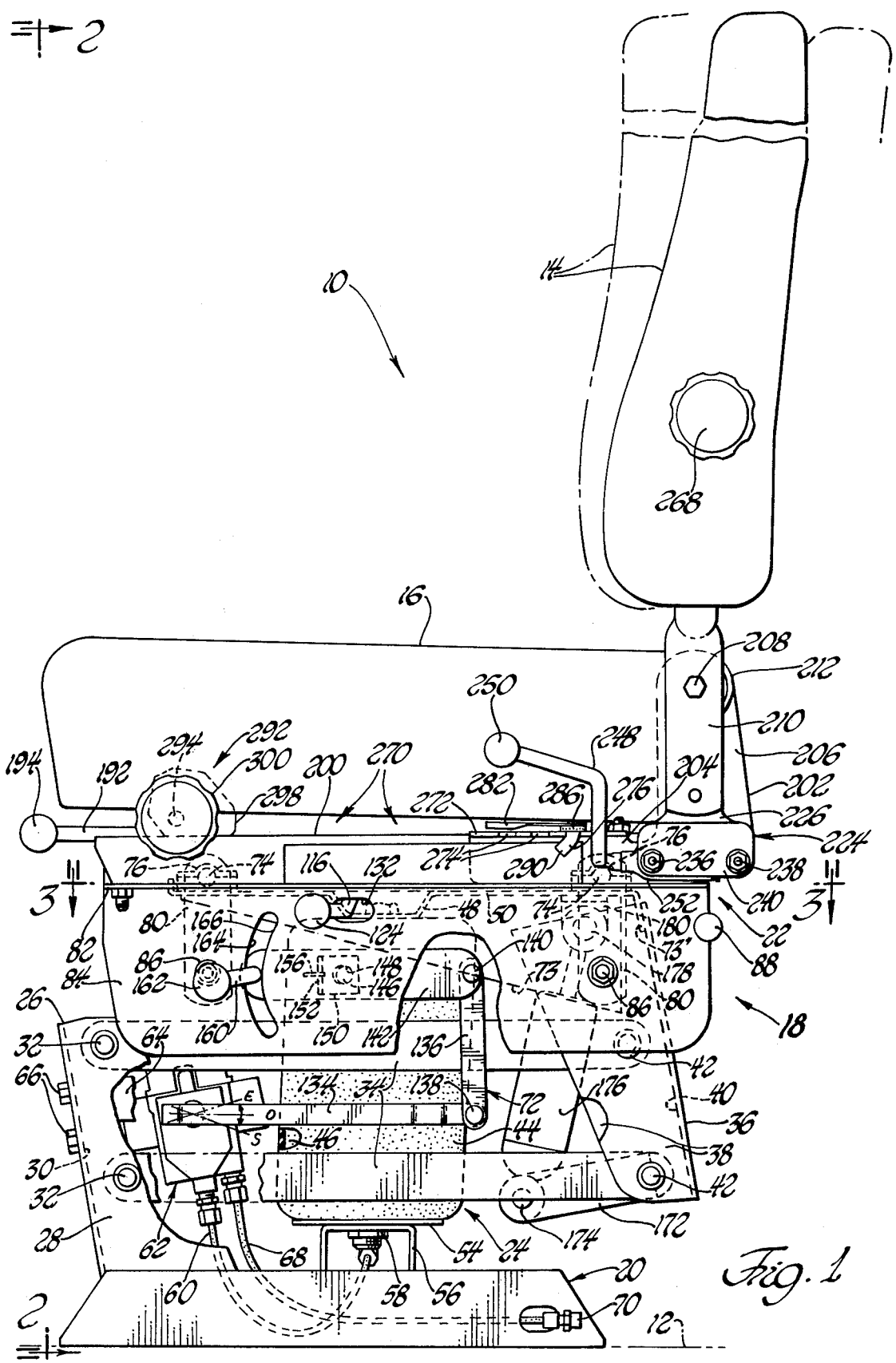
FIG. 1 is a partially broken away side elevation view of a vehicle seat embodying the present invention.

Referring to FIG. 1 of the drawings, a vehicle seat embodying the present invention is collectively indicated by reference numeral 10 and is mounted on a vehicle floor 12 shown by phantom lines. The seating components of seat 10 include an upright seat back 14 and a generally horizontal seat cushion 16. Seat back 14 and seat cushion 16 are mounted on the vehicle floor 12 by a support assembly 18. A lower floor base 20 of the support assembly is mounted on the floor 12 and secured in any suitable manner such as by threaded nuts and bolts. An upper base 22 of the support assembly mounts the seat back 14 and seat cushion 16 for adjusting movement in a manner that will be more fully hereinafter described. The support assembly 18 also includes a fluid support system 24 that adjustably positions the upper base 22 with respect to the lower base 20.

Figure 2:
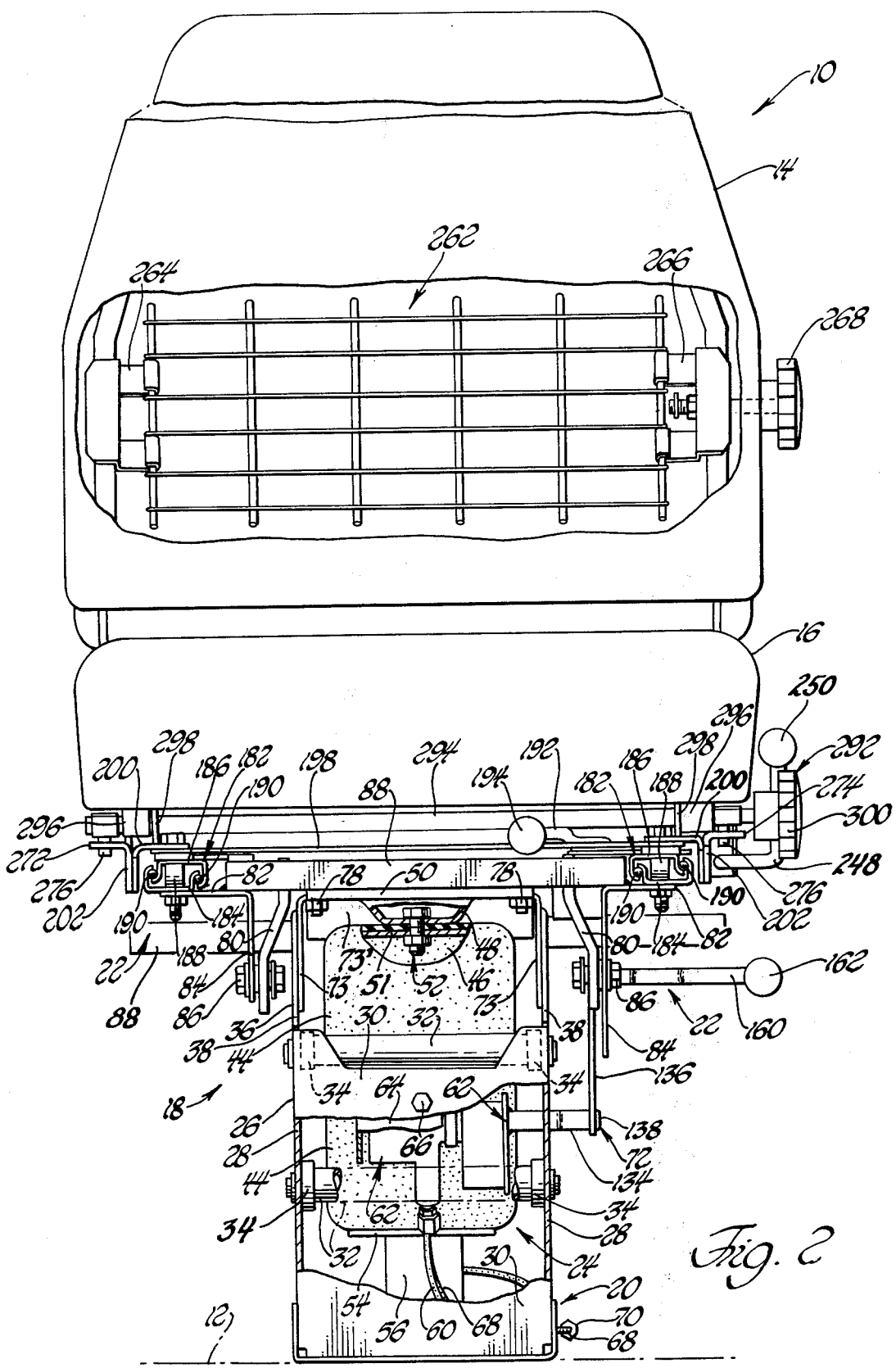
FIG. 2 is a partially broken away front elevation view of the seat taken along line 2—2 of FIG. 1.

As seen by reference to FIGS. 1 and 2, the forward end of lower base 20 includes an upwardly extending portion 26 that has a pair of laterally spaced flanges 28 connected by a web 30. A pair of tubular pintle members 32 extend between the flanges 28 in a parallel relationship to web 30 and pivotally support the adjacent ends of two pairs of upper and lower links 34 that have elongated configurations. As seen in FIG. 1, the upper base 22 includes a downwardly depending portion 36 that has laterally spaced flanges 38 connected by a web 40 in a manner similar to the upwardly extending portion 26 of the lower base. Pintle members 42 extend between the flanges 38 and pivotally support the adjacent ends of the two pairs of upper and lower links 34. Links 34 thus mount the upper base 22 on the lower base 20 in a parallelogram linkage fashion so as to guide the upper base during vertical movement with respect to the lower base.

With reference to FIGS. 1 and 2, a fluid spring 44 of fluid support system 24 takes the form of a rubber bellows that defines a chamber 46 for receiving pressurized fluid. The upper end of fluid spring 44 is engaged with a downwardly depending depression 48 in a sub-base 50 of upper base 22. As seen in FIG. 2, a nut and bolt arrangement 52 extends between the sub-base depression 48 and a plate 51 received within the chamber 46 to secure the upper end of fluid spring 44 to the sub-base. The lower end of fluid spring 44 is secured in a similar manner to a plate 54 carried by a bracket 56 on the lower base 20. Bracket 56 also supports a fitting 58, FIG. 1, that feeds pressurized fluid to the fluid spring from a conduit 60 whose flow is controlled by a time delay valve 62. A bracket 64 is secured to the web 30 of upwardly extending upwardlyextending base portion 26 by bolts 66 and mounts the time delay valve 62 between the two pairs of spaced links 34. A conduit 68 has a fitting 70 that is attachable to a suitable source of pressurized fluid so as to feed pressurized fluid to the valve. The level of pressurized fluid the valve 62 normally transmits to the fluid spring 44 is governed by a control linkage 72. The control linkage 72, which will be described later in more detail, is adjustable to increase or decrease the pressure of fluid within the fluid spring 44 so as to control the vertical position at which the fluid spring positions the upper base 22. The time delay valve 62 feeds pressurized fluid to the fluid spring 44 when the control linkage 72 indicates that the upper base 22 is at a lower height than the height that corresponds to the position to which the control linkage has been adjusted. The time delay valve 62 also exhausts pressurized fluid from the fluid spring 44 to the environment when the adjusted control linkage 72 indicates that the upper base 22 is higher than the height that corresponds to the adjusted control linkage position. Since the pressurized fluid utilized is sometimes exhausted to the environment, it is preferable to utilize pressurized air; however, other pressurized gases and even suitable liquids may be used with the fluid support system by recycling the fluid that is chosen.

The control linkage 72 thus senses the vertical height of the upper base 22 and through the valve 62 controls this height by either supplying pressurized fluid to the fluid spring 44 or exhausting pressurized fluid from the fluid spring. The static vertical seat position for any adjusted position of the control linkage is thus constant regardless of the weight of the seat occupant. However, when the upper base 22 moves vertically due to dynamic forces present during vehicle use, the time delay operation of valve 62 prevents the control linkage 72 from transiently supplying and exhausting the fluid within spring 44 as the seat moves above and below its adjusted vertical position. The fluid spring 44 also isolates a seat occupant from vertical vehicle vibrations during vehicle operation by the cushioning effect it provides.

Figure 3:
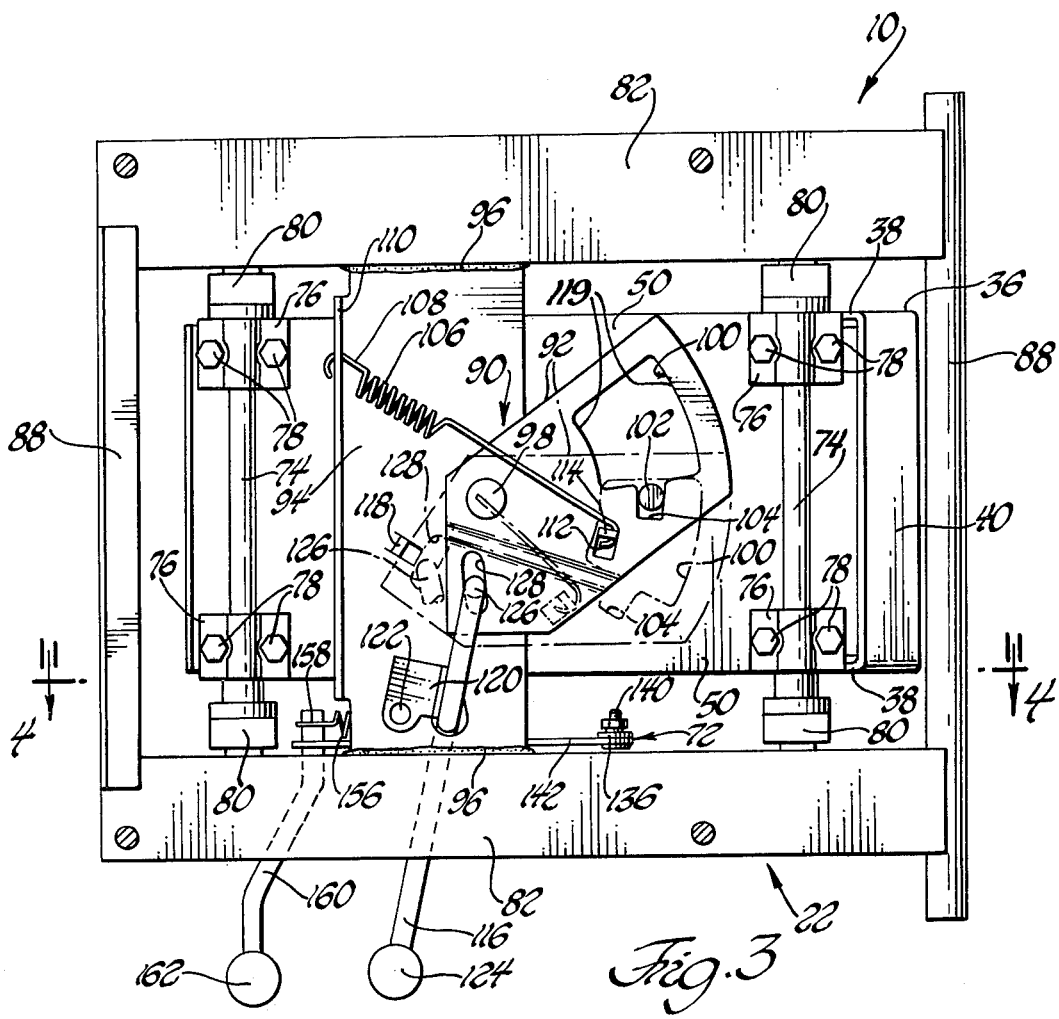
FIG. 3 is a plan view taken through the seat along line 3—3 of FIG. 1.

With reference to FIGS. 1, 2 and 3, the sub-base 50 which is supported on the upper end of fluid spring 44 has a generally rectangular configuration that is elongated in a forward and rearward direction with respect to the seat. At the sides of the sub-base 50, a pair of downwardly depending triangular flanges 73, FIG. 1, cooperate with a downwardly depending rear end flange 73' to secure the upper end of the downwardly depending base portion 36 by any suitable means such as welding. A pair of shafts 74 are rotatably supported on the forward and rearward ends of sub-base 50 by journals 76 that are bolted to the sub-base by nut and bolt arrangements 78. Each shaft 74 supports the upper ends of a pair of suspension links 80 that depend downwardly therefrom on opposite sides of the fluid spring 44, as seen in FIG. 2. A pair of spaced side rails 82 of base 22 have L-shaped cross-sections and include downward extensions 84 that are supported on the lower ends of suspension links 80 by bushed nut and bolt arrangements 86. The forward and rearward ends of side rails 82 are connected to each other by end members 88 that extend laterally with respect to the seat, as seen in FIG. 3, and are secured to the side rails in any suitable manner such as by welding.

The suspension links 80 mount the side rails 82 for oscillating movement in a forward and rearward direction. The oscillating movement takes place about an equilibrium position where the suspension links 80 depend downwardly in a vertical orientation, as seen in FIG. 1. The seat cushion and back are supported by the base side rails 82 whose oscillation isolates a seated occupant from horizontal vehicle vibrations in a longitudinal direction with respect to the vehicle. As the seat moves forwardly and rearwardly with respect to the floor 12, the suspension links 80 pivot forwardly and rearwardly about their upper ends on the shafts 74 supported by the sub-base 50 on top of fluid spring 44. The force of gravity provides a bias that tends to return the seat to its equilibrium position where the links 80 depend downwardly in their vertical orientation. The extent of forward and rearward seat travel as the oscillation takes place does not have to be large (distances less than 2 inches will suffice) in order to provide comfort to a seat occupant during extended periods of vehicle travel.

When the occupant of seat 10 is the vehicle driver and must perform some maneuvering operation such as parking or backing up, it is desirable to eliminate the oscillating seat movement so the driver has a secure support from which he can manipulate the vehicle controls. A latch mechanism indicated by reference numeral 90 in FIG. 3 is selectively operable to hold the seat against its oscillating movement. A latch member 92 of the latch mechanism is supported on a plate 94 that extends between the upper base side rails 82 and is secured thereto by welds 96. The latch member 92 is supported on plate 94 by a pin 98 for pivotal movement about a vertical axis between the solid and phantom line indicated latching and nonlatching positions shown by FIG. 3. Latch member 92 has a plate-like construction whose plane is located in a horizontal orientation and defines an opening 100.

A keeper 102 of latch mechanism 90 is fixedly mounted on the upper side of sub-base 50 extending upwardly therefrom so as to be received within the opening 100 of the latch member. The keeper 102 has a round cross-section and is received within an open ended keeper slot 104 of latch member opening 100 when the latch member is in its solid line latching position. The keeper slot 104 has a slightly smaller width at its closed end than at its open end so that the forwardly and rearwardly facing latch surfaces of the keeper are respectively engaged with the opposed rearwardly and forwardly facing latch surfaces of the slot in a manner that provides rattle-free latching of the seat against its oscillating movement. An overcenter spring 106 has one end 108 hooked to a flange 110 of the latch mechanism support plate 94 and has another end 112 hooked to an attachment flange 114 on the latch member. Spring 106 tends to bias the latch member 92 counterclockwise when it is located in the latching position and thus tends to engage the forwardly and rearwardly facing latch surfaces of keeper slot 104 with those of the keeper 102.

Figure 4:
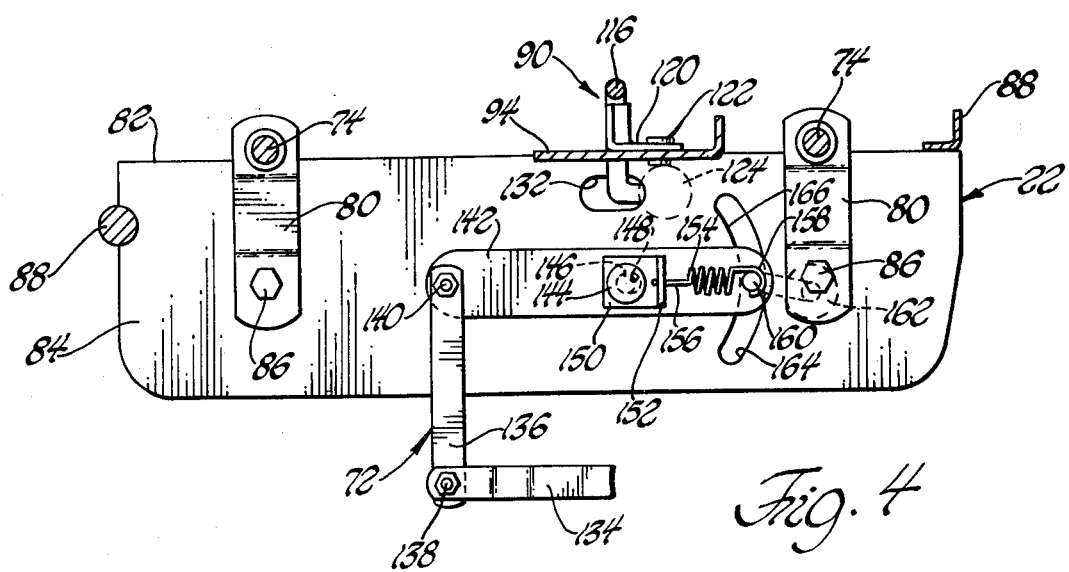
FIG. 4 is an elevation view taken along line 4—4 of FIG. 3.

An operator handle 116 of latch mechanism 90 is operable to move the latch member 92 from its latching position to its nonlatching position where the keeper 102 is received within the larger portion of latch member opening 100 so that the oscillating seat movement can take place. The spring 106 moves over the center of pin 98 as the latch member 92 is moved to its nonlatching position and biases the latch member 92 clockwise about pin 98 into engagement with a stop 118 on the support plate 94. The operator handle 116 is fixedly secured to a flanged member 120 that is pivotally supported on the support plate 94 by a pin 122. A knob 124 on the outer end of the handle is manually grasped to move the handle about a vertical support axis of pin 122 and a downwardly extending inner end 126 of the handle is received within an elongated slot 128 in the latch member to provide the latch member movement as the handle is rotated. The inner end 126 of the handle slides longitudinally within the latch member slot 128 as it is moved about pin 122 to move the latch member between its latching and nonlatching positions. As the handle 116 is rotated to move the latch member to its nonlatching position, the stop 118 is engaged before the keeper 102 engages the counterclockwise edge of the latch member opening 100 so that there is no friction generated when the seat oscillates forwardly and rearwardly. The handle 116 extends in an outward direction from the latch member 92 and, as seen in FIG. 4, passes through an opening 132 in the downwardly extending flange 84 of its adjacent side rail 82 of the upper base 22. Arcuate stop surfaces 119 of the large portion of latch member opening 100 are generated about the axis of latch member movement at pin 98 and engage the keeper 102 in the nonlatching position to limit the degree of oscillating seat movement.

With reference to FIG. 1, the control linkage 72 extending between upper base 22 and time delay valve 62 is moved not only by the dynamic vertical movement of the upper base but by its oscillating movement as well. The control linkage 72 includes an elongated valve actuating link 134 with one end connected to the valve 62 and another end pivoted by a pin 138 to the lower end of a vertically extending connecting link 136. The upper end of connecting link 136 is pivoted by a pin 140 to an adjustment link 142 best seen in FIG. 4. The adjustment link 142 is pivotally mounted by a headed pin 144 on the downwardly extending flange 84 of the adjacent upper base side rail 82. A shaft 146 of pin 144 is secured to the adjacent flange 84, such as by welding, and is received within a slightly elongated slot 148 in the link 142 to rotatably support this link. Pin shaft 146 also rotatably supports a spring attachment plate 150 having an attachment flange 152. A helical spring 154 has one end 156 secured to the flange 152 of plate 150 and has another end 158 hooked over the inner end of an operator handle 160 fixedly secured to the end of adjustment link 142 opposite the pin 140. The outer end of handle 160 supports a knob 162 that is manually grasped and moved by a seat occupant to provide adjustment of control linkage 72. An intermediate portion of handle 160 is received with an arcuate slot 164 in the side rail flange 184 of upper base 22. Slot 164 is generated about the pin shaft 146 and has an arcuate surface 166 that is frictionally engaged by the handle 160 due to the bias of spring 154. The frictional engagement is sufficiently large to prevent movement of the handle within the slot except by operator actuation. The slot 148 in the connecting link permits this link to shift bodily to ensure the frictional engagement between the handle and the slot, thereby maintaining the control linkage in any adjusted position to which it is manually moved.

The control linkage 72 has a somewhat U-shaped configuration that opens in a horizontal manner forwardly with respect to the seat. The linkage configuration positions the adjustment link handle 160 in an accessible location for a seat occupant.

With reference to FIG. 1, the time delay valve 62 is controlled by pivotal movement of link 134 from an equilibrium position O toward either supply or exhaust positions S or E, respectively. If an occupant of seat 10 desires the seat to be moved to a higher position, he grasps the handle knob 162 and moves the handle upwardly so that the adjustment link 142 pivots clockwise about pin shaft 146 and moves the connecting link 136 downwardly in a manner that pivots the valve actuating link 134 clockwise to its supply position S. After a predetermined time delay period of valve 62 passes, the valve begins to supply pressurized fluid to the fluid spring 44 to raise the seat. As the seat is raised, the upward movement of the pin shaft 146 carries the adjustment link 142 upwardly and causes the connecting link 136 to pull upwardly on link 134 so that it moves back toward its equilibrium position O. When the actuating link 134 has returned to its equilibrium position, the valve 62 terminates its supply of fluid pressure to the fluid spring 44 which then maintains the seat at a vertical height corresponding to the adjusted position of the control linkage. If the seat occupant desires to lower the seat, he grasps the knob 162 and moves it downwardly so that the adjustment 142 pulls up on connecting link 136 and pivots the actuating link 134 counterclockwise toward its exhaust position E. After the predetermined time delay period of valve 62 passes, the valve begins to exhaust the pressurized fluid within fluid spring 144 so that the seat moves downwardly.

The pin shaft 146 carries the adjustment link 142 downwardly as the pressurized fluid is being exhausted from the fluid spring and thereby moves the connecting link 136 downwardly so that the actuating link 134 moves in a clockwise direction toward its equilibrium position O. Upon reaching the equilibrium position, the actuating link 134 terminates its exhaustion of pressurized fluid within the fluid spring and the seat then remains at a vertical height corresponding to the adjusted position of the control linkage.

The fluid spring 44 isolates a seat occupant from vertical vehicle vibrations as a result of the dynamic action that takes place during vehicle operation. The time delay operation of valve 62 prevents the dynamic upward and downward seat movement that takes place from causing control linkage 72 to transiently actuate the valve in either its supply or exhaust mode. Also, the oscillating forward and rearward movement of the seat that isolates the seat occupant from horizontal vibrations likewise cannot actuate the valve through the control linkage due to the time delay operation of the valve. Valves like valve 62 which are actuated for time delayed supply and exhaust operation by actuating movement in opposite directions are known per se, and no detailed description thereof is necessary. One such valve that functions in this manner is disclosed by Pribonic U.S. Pat. No. 2,957,704. Also, it has been found that the frequencies of dynamic seat movement in heavy trucks is usually no lower than 2 cycles per second, i.e. the longest time period is 0.5 seconds per cycle. The valve actuating link 134 is above the equilibrium position during half of the cycle and below it the other half, and a time delay period of 0.25 seconds (½ the time period of the longest cycle) is thus long enough to prevent any transient actuation of the valve due to the dynamic seat movement. However, using an extra long time delay period of no less than 0.75 seconds ensures the prevention of transient valve actuation while still giving quick response of the seat in its adjusting mode of movement. In fact, the delay period can be as long as 2 seconds while still maintaining sufficiently fast adjusting response.

With reference to FIG. 1, the pin 42 that pivotally supports the rearward ends of the lower links 34 has one end of a link 172 fixedly mounted to it in any suitable manner between the spaced flanges 38 of the downwardly extending base portion 36. The other end of link 172 is secured by a pin 174 to the lower end of a shock absorber 176. The upper end of shock absorber 176 is secured by a pin 178 to a flange 180 mounted on the lower side of sub-base 50 between its downwardly extending triangular flanges 73. Extension and retraction of shock absorber 176 provides a damping restraint to the dynamic vertical movement of the sub-base 50. However, the shock absorber 176 permits the adjustment of control linkage 72 to move the sub-base vertically to any of its adjusted positions without affecting the position to which it moves.

With reference to FIG. 2, the side rails 82 of upper base 22 have a pair of adjuster assemblies 182 mounted on their upper sides. The adjuster assemblies are elongated and extend along the longitudinal length of the vehicle to permit forward and rearward adjusting movement of the seat cushion 16 and the seat back 14 with respect to the vehicle controls. Each adjuster assembly includes a lower track 184 supporting an upper track 186 by rollers 188 and balls 190. The rollers 188 carry the vertical load between the upper and lower tracks and the balls 190 carry side loads. A handle 192 carries a knob 194 that is manually grasped and moved to control an unshown latch mechanism for the adjuster assemblies. The latch mechanism is of a conventional type that permits longitudinal adjusting movement of the seat cushion and seat back while in a nonlatching position and which prevents such movement while in a latching position. A pair of forward and rearward cross members 198, see also FIG. 7, extend between the upper tracks 186 at their forward and rearward ends and support a pair of longitudinally extending support rails 200 associated with opposite sides of the seat. The rear end of each support rail 200 has an associated support member 202 mounted on it, as seen by the left-hand one shown in FIGS. 6 and 7. Each support member 202 is of an L-shaped configuration with a horizontal leg 204 suitably secured in a fixed manner to the side of its associated support rail and an upwardly extending vertical leg 206. The upper end of support member leg 206 carries a nut and bolt arrangement 208 that provides a pivotal support for a downwardly extending bracket arrangement 210 mounted on the associated side of the seat back 14. A torsion spring 212 is received between the seat back bracket arrangement 210 and the support member leg 206 and has an intermediate portion 214 encircling the nut and bolt arrangement 208. One leg 216 of the torsion spring is received within an aperture 218 in the bracket arrangement and another spring leg 220 is received within an aperture 222 in the support member leg 206. The springs 212 associated with the opposite sides of the seat provide a bias that normally tilts the seat back 14 forwardly about its pivotal support on the nut and bolt arrangements 208 at each side of the seat.

With reference to FIGS. 5 through 8, a recliner mechanism 224 is associated with the left-hand side of the seat and includes a keeper 226 fixedly secured in any suitable manner to the lower end of the seat back bracket arrangement 210. The keeper 226 has a generally plate-like construction and includes a plurality of keeper teeth 228 that are arranged in an arcuate configuration generated about the pivotal seat back support axis provided by the associated nut and bolt arrangement 208. A stop 230 is located at each end of the arcuate configuration of keeper teeth. A pawl 232 of the recliner mechanism extends between the support member 202 and a support plate 234 that is mounted on the support member by a pair of bolts 236 and 238. The bolts 236 and 238 also mount a trim plate 240 that covers the support plate 234. An opening 242 in the support plate has a somewhat U-shaped configuration receiving the U-shaped cross-section of one end of pawl 232. The U-shaped cross-section of the other end of pawl 232 is slidably received by a similar opening 244 in the support member 202 at the juncture of its horizontal and vertical legs 204 and 206. The support plate 234 and support member 202 thus provide support portions that slidably mount the pawl 232 for vertical movement between an upper latching position and a lower nonlatching position. With the pawl 232 in the upper latching position shown in FIGS. 5, 6 and 8, the two upwardly extending legs 246 of the pawl are received between adjacent pairs of keeper teeth 228 to prevent tilting movement of the seat back. Forces applied to the pawl by the seat back are transferred to the support member 202 and the support plate 234 in a balanced manner due to the positioning of the keeper 226 between these two components. Between the pawl legs 246, one of the openings between the keeper teeth 228 is unoccupied so that each pawl leg is positioned by two separate keeper teeth in a manner that provides a strong and durable mechanism.

An actuating member 248 of the recliner mechanism 224 is pivotally supported by bolt 236 and has a manually grasped knob 250 at one end thereof as well as a pair of spaced yoke portions 252 at its other end. The yoke portions 252 are received between the support plate 234 and the support member 202 on opposite sides of keeper 226 and define openings 254 that receive the pawl 232 so as to move the pawl vertically between its upper latching position and lower nonlatching position upon pivotal movement of the actuating member. As seen in FIG. 6, a helical spring 256 has a lower end 258 hooked over one of the yoke portions 252 and has an upper end 260 received by the support member opening 222 that also receives the torsion spring leg 220. The spring 256 provides a bias that normally positions the actuating member 248 in its FIG. 5 solid line indicated position where the pawl 232 is in its latching position engaging the keeper 226. Upward pivotal movement of the knob 250 to the phantom line position causes the yoke portions 252 to move downwardly and move the pawl to its lower nonlatching position where tilting adjustment movement of the seat back 14 is permitted. The stops 230 of the keeper 226 engage the unlatched pawl 232 to limit the extent of the tilting seat back movement.

With reference to FIG. 2, in addition to the forward and rearward adjusting movement of seat back 14, an adjustable wire support arrangement 262 within the seat back has one lateral end thereof secured by a bracket 264 to one lateral side of the seat and has another end secured by a bracket 266 to the other end of the seat in an adjustable manner controlled by a rotation of a knob 268. Rotation of the knob 268 in one direction moves the bracket 266 to the right so as to provide a more taut condition that gives the seat back a firmer feel. Rotation of the knob 268 in the other direction loosens the wire support arrangement to give the seat back a softer feel.

With reference to FIGS. 1, 5, 7 and 9, an adjustable mounting arrangement 270 secures the seat cushion 16 to the upper support rails 200 at each side of the seat so that forward and rearward adjusting of the seat cushion is permitted while the seat back 14 remains stationary. Each of the forwardly extending legs 204 of the support members 202 at each side of the seat includes a keeper flange 272 that extends laterally outwardly from its associated support rail 200. Three longitudinally spaced slots or openings 274 in each flange 272 open laterally in an outboard direction, and one of the openings receives a downwardly extending latch member 276 mounted on the adjacent lower side of seat cushion 16. As seen by particular reference to FIG. 9, the latch member 276 extends upwardly through an aperture 278 in a seat cushion frame member 280. The upwardly extending portion of the latch member also extends through an aperture in a latch handle 282 and has flats 284 so that rotation of the handle rotates the latch member about a generally vertical axis. The lower side of the handle 282 carries a rubber washer 286 that is supported by the flange 272 of the associated support member 202. A pin 288 extends through the upper portion of the latch member 276 above the seat cushion frame member 280 to hold the latch member against downward movement. The latch member 276 also has a latching portion 290 that is bent at approximately 45° to the vertical axis of rotation of the latch member.

At each side of the seat the handle 282 moves its associated latch member 276 from the latching position shown in FIGS. 5 and 7 to a nonlatching position where longitudinal adjustment of the seat cushion 16 is permitted. The latch member 276 is rotated approximately 90° in a counterclockwise direction as viewed in FIG. 7 from the latching position to the nonlatching position so as to align the latching portion 290 with the elongated direction of the opening 274 in which it is received. The alignment of the latching portion 290 and the opening 274 on the mounting arrangements at each side of the seat cushion 16 permits upward vertical movement of the seat cushion so that it is free from the rest of the seat. The seat cushion 16 may then be moved longitudinally to align the latch member 276 with one of the other openings 274, and subsequent downward movement of the seat then moves the latch member through that particular opening so that the latch handle 282 may be rotated to move the latching portion 290 out of alignment with the opening in a manner that again secures the seat cushion with respect to the seat but at a different longitudinally adjusted position. This latching rotation provides a camming action between the latch portion 290 and the edge of the opening 274. The camming compresses washer 286, the washer having a normal thickness about twice that shown, so that the washer compression maintains the latch member 276 in its latching position.

With reference to FIGS. 1 and 2, the mounting arrangement 270 for the seat cushion 16 also includes a tilt adjuster 292 for controlling the vertical height of the forward end of the seat cushion. The tilt adjuster includes a laterally extending shaft 294 that is rotatably supported by a pair of journals 296 on the lower side of seat cushion 16. A pair of cams 298 are fixed on the opposite ends of shaft 294 inboard of the journals 296 and engage the upper sides of the adjacent support rails 200. A knob 300 rotates the shaft 294 so as to rotate the cams 298 and provide adjustment of the vertical height of the forward end of the seat cushion. Friction between the journals 296 and the shaft 294 maintains the seat cushion 16 in any adjusted position. The tilting seat movement takes place about a laterally extending seat cushion axis that passes through the two latch members 276 at each side of the rear end of the seat. The compressed rubber washers 286 associated with each side of the seat are further compressed to permit the tilting while still supporting the rear end of the seat in a rattle-free manner.

While a preferred embodiment has been described, those skilled in the art will recognize various alternatives which may be used to embody the invention described by the following claims.

What is claimed is:
1. A vehicle seat support assembly comprising:
a seat base for supporting a vehicle seat;
support means for supporting the seat base on a vehicle floor and including a sub-base on which the seat base is mounted by pivotal suspension links for oscillation forwardly and rearwardly with respect to the vehicle in a manner that isolates the seat base from horizontal longitudinal vehicle vibrations; and
a latch mechanism including a keeper fixed to one of the bases and having latch surfaces facing for- wardly and rearwardly with respect to the vehicle, the latch mechanism also including a latch member pivotally mounted on the other base about an axis generally perpendicular to the pivotal axes of the suspension links for selective movement between latching and nonlatching positions with respect to the keeper, the latch member having latch surfaces that face forwardly and rearwardly with respect to the vehicle in the latching position to respectively engage the rearwardly and forwardly facing latch surfaces of the keeper, the engagement between the latch surfaces of the keeper and latch member selectively preventing the oscillating movement of the seat base in a rattle-free manner when the latch member is in the latching position, disengagement of the latch surfaces on the latch member and the keeper as the latch member is moved from the latching position to the nonlatching position permitting the seat base to move in the oscillating manner in isolation from horizontal longitudinal vehicle vibrations, and an overcenter spring extending between the latch member and the base on which the latch member is pivotally mounted, the overcenter spring moving across the axis of pivotal latch member movement and thereby selectively and alternately biasing the latch member to either the latching or nonlatching position so as to prevent or allow the horizontal oscillating seat movement.

2. An assembly according to claim 1 wherein the latch member is pivotally mounted for movement between the latching and nonlatching positions on the seat base.

3. An assembly according to claim 1 wherein the seat base is mounted on the sub-base by four suspension links for the oscillating forward and rearward seat movement.

4. An assembly according to claim 1 wherein the overcenter spring for positioning the latch member is of the helical type.

5. An assembly according to claim 1 wherein the latch member has an open-ended slot that is smaller at its closed end than its open end and defines the forwardly and rearwardly facing latch surfaces of the latch member in the latching position.

6. An assembly according to claim 1 wherein the latch member is manually moved between the latching and nonlatching positions.

7. An assembly according to claim 6 wherein a manually grasped handle moves the latch member.

8. An assembly according to claim 7 wherein the handle is engaged with the latch member in a pin-and-slot fashion.

9. A vehicle seat support assembly comprising:
a seat base for supporting a vehicle seat;
support means for supporting the seat base on a vehicle floor, the support means including a sub-base and suspension links pivoted to both the seat base and the sub-base so as to suspend the seat base for forward and rearward oscillating movement with respect to the vehicle to isolate the seat base from horizontal longitudinal vehicle vibrations;
a latch mechanism including a keeper fixed on the sub-base and having latch surfaces facing forwardly and rearwardly with respect to the vehicle, the latch mechanism also including a plate-like latch member pivotally mounted in a horizontal orientation on the seat base about an axis generally perpendicular to the pivotal axes of the suspension links for movement between latching and nonlatching positions with respect to the keeper, the latch member defining an opening having a large portion in which the keeper is received in the nonlatching position to permit the oscillating movement and an open ended slot portion in which the keeper is received in the latching position, the open ended slot portion of the latch member opening having forwardly and rearwardly facing sides in the latching position that provide latch surfaces engaging the latch surfaces of the keeper to prevent the oscillating movement in a rattle-free manner, and an overcenter spring extending between the latch member and the seat base, the overcenter spring moving across the axis of latch member pivoting and thereby selectively and alternately biasing the latch member to either the latching or nonlatching position to allow or prevent the oscillating seat base movement.

10. An assembly according to claim 9 wherein a handle is pivotally mounted on the seat base about an axis spaced from the axis of latch member movement, the handle being engaged with the latch member by a pin-and-slot cnnection so that pivoting of the handle moves the latch member while sliding of the pin-and-slot connection takes place.

11. An assembly according to claim 9 wherein the overcenter spring is of a helical configuration with one end thereof connected to the latch member and the other end thereof connected to the seat base so that the longitudinal axis of the spring moves overcenter of the axis of latch member movement as the latch member moves between its latching and nonlatching positions in a manner enabling the spring to provide its biasing action to either position.

12. An assembly according to claim 9 wherein the latch member has a plate-like construction and pivots about a generally vertical axis in a generally horizontal plane between its latching and nonlatching positions.

13. An assembly according to claim 12 wherein the keeper extends upwardly from the sub-base to be received by the opening in the latch member.

14. An assembly according to claim 14 wherein the latch member is pivotally supported on a support plate that extends between side rails of the seat base.

15. An assembly according to claim 13 wherein the support plate is located between front and rear pairs of the suspension links that mount the seat base on the sub-base for its oscillating movement.

16. An assembly according to claim 9 wherein the large portion of the latch member opening defines stop surfaces that limit the degree of oscillating seat movement by engaging the keeper in the nonlatching position.

17. An assembly according to claim 16 wherein the stop surfaces are arcuate and are generated about the axis of latch member movement.

* * * * *

UNITED STATES PATENT OFFICE
CERTIFICATE OF CORRECTION

Patent No. 3,957,243            Dated May 18, 1976

Inventor(s) Robert W. Costin and Randal T. Murphy

It is certified that error appears in the above-identified patent and that said Letters Patent are hereby corrected as shown below:

Column 3, line 40, after "of" insert --the--.

Column 3, line 40, delete second instance "upwardly extending".

Column 12, line 29, (Claim 10), "cnnection" should be --connection--.

Column 12, line 49 (Claim 14) second instance "14" should be --13--.

Column 12, line 52, (Claim 15), "13" should be --14--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*